Patented June 8, 1926.

1,587,661

UNITED STATES PATENT OFFICE.

FRED W. LOMMEN, OF PITTSBURGH, PENNSYLVANIA, ASSIGNOR TO CARBIDE & CARBON CHEMICALS CORPORATION, A CORPORATION OF NEW YORK.

PROCESS OF MAKING CROTONALDEHYDE.

No Drawing. Application filed August 24, 1925. Serial No. 52,221.

This invention is a process of making crotonaldehyde from aldol ($\beta$-hydroxy butyraldehyde) or materials containing it. The reaction according to which aldol is decomposed into crotonaldehyde and water is illustrated by the following equation:

$$\underset{\text{Aldol}}{CH_3CHOH.CH_2CHO} \rightarrow \underset{\text{Crotonaldehyde}}{CH_3CH:CH.CHO} + H_2O$$

Acording to the processes of making crotonaldehyde from aldol heretofore employed the yield of crotonaldehyde has been relatively low and the product ordinarily contains substantial amounts of impurities. These may include acetaldehyde, crotonic acid, acetic acid, acetals, and other substances depending upon the nature of the process. They are difficult to remove and may prove troublesome in the subsequent treatment of the crotonaldehyde.

I have found that the formation of substantial quantities of such undesirable impurities or residues is avoided by carrying out the process in a manner now to be described. In accordance with my invention, it is possible to obtain better yields than in the prior processes, and other advantages will become apparent as the description proceeds.

The following example is illustrative of the invention: Aldol is slowly added to a dilute solution of sulphuric acid maintained preferably at boiling. The aldol is immediately decomposed into crotonaldehyde and water, which are distilled from the reaction vessel practically as fast as formed. In order to maintain the concentration of the dilute acid solution substantially constant a distilling head or rectifying column may be used to prevent the removal of excess water, or a portion of the water separating in the receiver may be returned to the reaction vessel. Preferably, the acid concentration should be kept below 5%.

If desired the reacting mixture may be maintained under pressure other than atmospheric. It is essential that the temperature and pressure conditions be so maintained that the crotonaldehyde formed shall be removed practically as fast as formed.

When sub-atmospheric pressures are used the expulsion of the crotonaldehyde is promoted, and lower temperatures may be used.

It is also within the scope of the invention to use dilute solutions of other strong acids, for example, phosphoric acid.

The rapid removal of the crotonaldehyde in accordance with the present invention substantially prevents the formation of troublesome condensation products and residues. Yields in excess of 90% of the theoretical have been uniformly obtained.

While it is impossible for me to state exactly how the above-described process acts to prevent the formation of undesired impurities and residues, it seems possible that the initial presence of water in the reaction mixture pursuant to mass action principles hinders the formation of higher condensation products by reactions in which water is eliminated. The possibility of reaction between crotonaldehyde and by-products already formed in the reaction vessel is reduced to a minimum by removing the crotonaldehyde immediately after it forms.

I claim:

1. Process of making crotonaldehyde comprising introducing a material containing aldol into a boiling dilute acid solution and removing the decomposition products substantially as fast as formed.

2. Process of making crotonaldehyde comprising subjecting aldol to a decomposition temperature in a boiling dilute acid solution and removing the decomposition products as formed.

3. Process of making crotonaldehyde comprising feeding aldol gradually into a boiling dilute acid solution and removing the decomposition products as formed.

4. Process of making crotonaldehyde comprising introducing a material containing aldol into a boiling dilute acid solution and removing the crotonaldehyde substantially as fast as formed, while maintaining the acid solution at substantially constant concentration.

In testimony whereof, I affix my signature.

FRED W. LOMMEN.